March 12, 1940.  A. H. EMERY ET AL  2,193,673
MATERIALS TESTING MACHINE
Filed April 23, 1935  4 Sheets-Sheet 1

INVENTORS
A. H. Emery
H. J. Ruge
By

March 12, 1940.  A. H. EMERY ET AL  2,193,673
MATERIALS TESTING MACHINE
Filed April 23, 1935  4 Sheets-Sheet 2

INVENTORS
A. H. Emery
H. J. Ruch
Edward Hathaway ATTY.

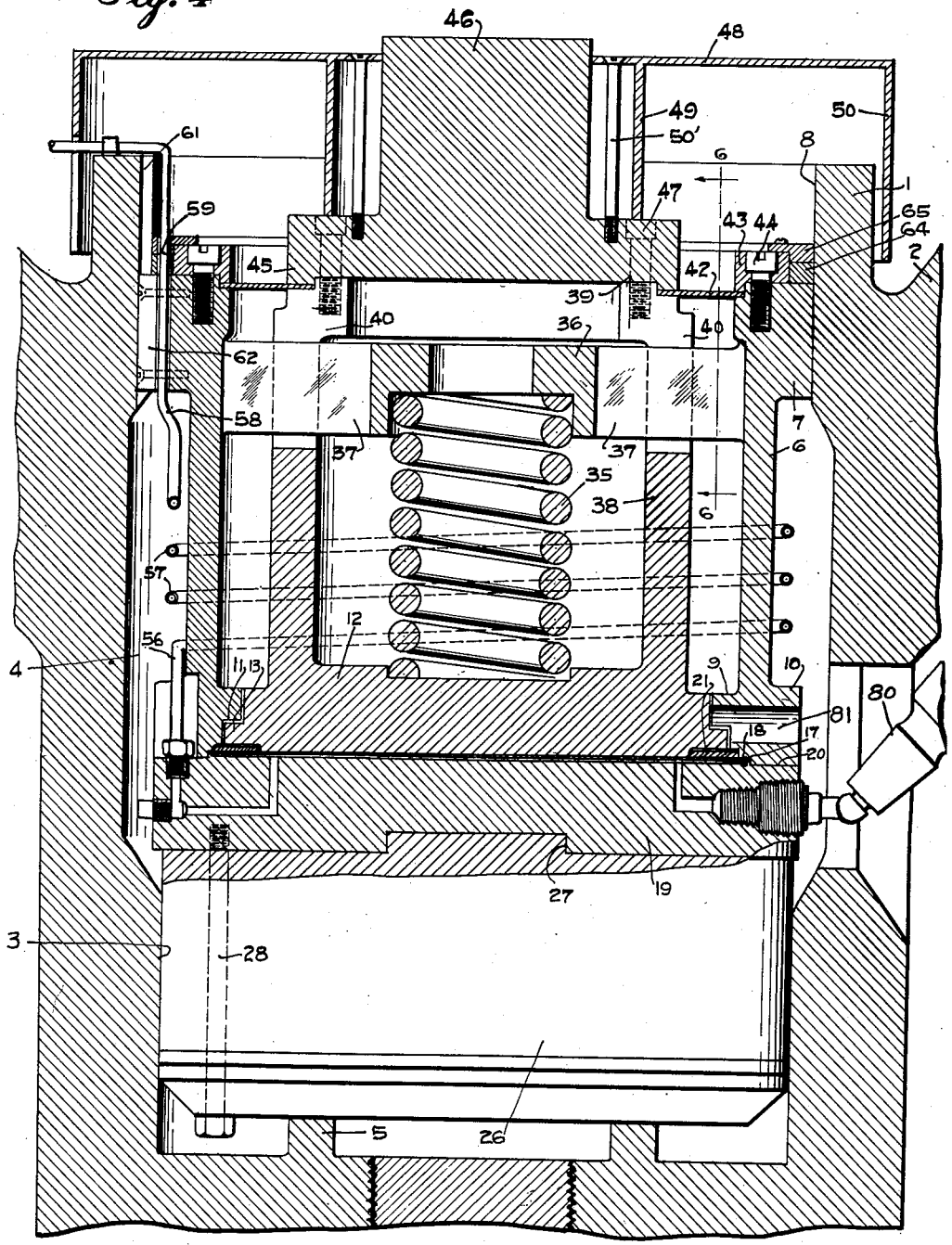

March 12, 1940.  A. H. EMERY ET AL  2,193,673
MATERIALS TESTING MACHINE
Filed April 23, 1935  4 Sheets-Sheet 4

INVENTORS
A. H. EMERY
H. J. RUCH
BY
ATTORNEY

Patented Mar. 12, 1940

2,193,673

UNITED STATES PATENT OFFICE 2,193,673

MATERIALS TESTING MACHINE

Albert H. Emery, Stamford, Conn., and Herman J. Ruch, Woodbury Heights, N. J., assignors, by mesne assignments, to The Baldwin Locomotive Works, a corporation of Pennsylvania Application April 23, 1935, Serial No. 17,836

19 Claims. (Cl. 265—14)

This invention relates generally to hydraulic materials testing machines of the type employing an independent hydraulic load weighing system, and relates more particularly to a novel combination and structure of the weighing and load producing elements and to an improved and simplified frame structure and arrangement of elements associated therewith.

Various hydraulic materials testing machines have been heretofore proposed of the type employing an independent hydraulic weighing system, but such machines have been adapted more for general use which necessarily involves machines of relatively large size and expense. The arrangement and structure of the component parts of such machines are not conducive to compactness and low cost which are desirable features of machines for certain specialized uses such as compression tests of cement or similar material. Such a specialized machine is sometimes only infrequently used and hence it is desirable that the initial investment should be a minimum and that the machine should occupy only limited space, without sacrifice, however, of certain fine qualities of operation. While the preferred embodiment of the invention as shown herein is especially adapted for compression tests of cement, yet it will of course be understood that the machine may be used in other fields and that the principles and structures of the machine are adapted for tension or compression tests as is more fully disclosed in certain modifications.

One object of our invention is to provide an improved materials testing machine that is economical in manufacture, maintenance and operation, that is compact and sturdy, that has a high degree of accuracy and sensitivity and is thoroughly dependable to maintain such qualities over long periods of time and of use, and that permits ease of operation notwithstanding the rugged, compact and economical construction employed.

A further object is to provide an improved hydraulic materials testing machine having the well-known Emery hydraulic support type weighing system arranged in an improved manner so as to be accurately calibrated independently of the machine in which it is ultimately installed and adapted to retain that accuracy after installation. Heretofore it has been found desirable to calibrate the weighing system after its installation in the machine in which the system is permanently used. This permitted the calibration to take into consideration any inherent characteristics of the complete machine which might affect the calibration. In our improved combination we have accomplished accurate independent calibration while at the same time obtaining a very highly compact machine by providing an improved self-contained unit comprising a hydraulic weighing system and initial load means therefor together with a load producing ram. These three elements are bodily movable as a unit during application of hydraulic pressure on the ram to load the specimen. A loading platform or base upon which the specimen rests during the compression test also forms a part of the self-contained unit. It is this self-contained unitary feature that permits the weighing system to be calibrated separately from the machine in which it is ultimately installed without any sacrifice of accuracy, sensitivity or dependability when the unit is so ultimately installed.

Another object is to provide an improved hydraulic weighing support adapted to effectively receive and resist cross loads without injury to the support or in any way affecting its accuracy. As a result the axial component of non-central loads, which non-central loads are invariably present to some extent in the testing of concrete specimens, is accurately weighed notwithstanding the cross loads within the support itself. In one specific aspect of the invention we accomplish this by providing a hydraulic support having self-contained stay plates and initial loading means, the stay plates being axially spaced and one of the same comprising, preferably, the bridge ring of the diaphragm while the initial load means is specifically an axial compression spring.

A further object is to provide an improved machine as a whole whereby the self-contained unit may be readily removed from or inserted in the hydraulic load producing cylinder without dismantling the frame structure, it being understood that broadly the unit comprises a ram structure. As a result of this improved arrangement, we are able to provide an exceptionally rugged machine in which the parts are adapted to have a rigid relation at all times without in any way limiting or impairing the operation or usefulness of the machine, and in one aspect of the invention we preferably accomplish this by integrally casting the cylinder base, joining columns and crosshead.

Other objects are to provide an improved arrangement whereby suitable load indicating means, which are actuated by pressure from the hydraulic weighing system, will not be affected during bodily movement of the weighing system and yet will respond with a high degree of accuracy and sensitivity to any minute weighing movement of the weighing system notwithstanding that such movement is superimposed on said bodily movement. In one specific aspect of the invention we prefer to accomplish this result by having the pressure pipe, which connects the weighing system with the indicating mechanism, in the form of a coil surrounding the periphery of the self-contained load producing and weighing unit. As a result of this improved arrangement, the indicating mechanism may be mounted on a stationary member, the coils thereby providing a very flexible and unrestraining connection during bodily movement of the weighing system. In another aspect of the invention we accomplish the desired result by operatively supporting the indicating mechanism on the self-contained unit whereby bodily movement thereof will be accompanied by a corresponding bodily movement of the indicating mechanism with the result that no relative movement takes place between the hydraulic weighing support and the indicating mechanism. This arrangement is shown more particularly in connection with the modification of our improved machine wherein tension columns and a loading crosshead are formed as a part of the self-contained unit and extend upwardly therefrom to permit tension tests to be performed. The feature of having the indicating mechanism bodily carried by the self-contained unit permits unlimited movement thereof to accommodate specimens of different length or strain without in any way impairing the accuracy or sensitivity of the machine together with the other mentioned advantages.

Other objects and advantages will be more apparent to those skilled in the art from the following description of the accompanying drawings in which:

Fig. 4 is an enlarged vertical central sectional view of a portion of the base cylinder and the self-contained unit disposed therein;

Figure 1:
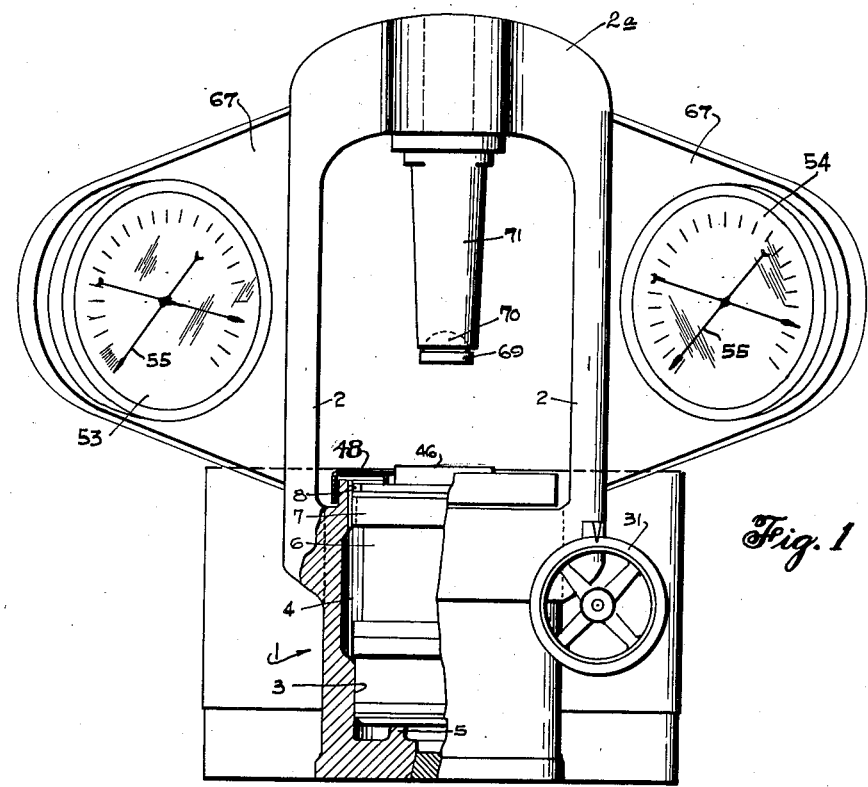
Fig. 1 is a front elevation of our improved machine with parts broken away to show the self-contained unit in partial elevation.
Figure 2:
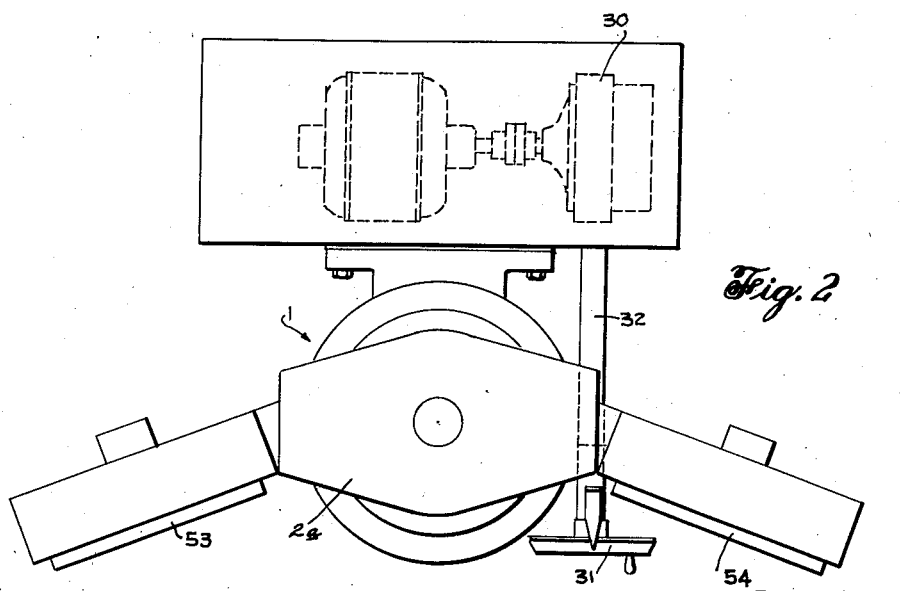
Fig. 2 is a plan view of the device shown in Fig. 1.
Figure 3:
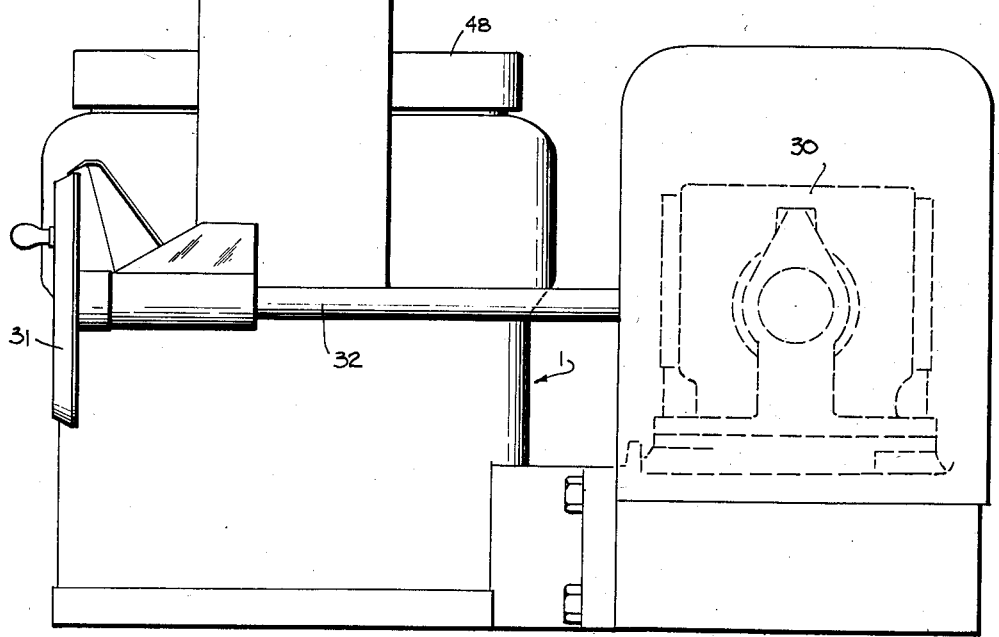
Fig. 3 is a side view of the device shown in Fig. 1 with the indicating mechanism omitted for sake of clarity.

In the particular embodiments of the invention which are shown herein merely for the purpose of illustrating certain specific forms among possible others that the invention might take in practice, we have shown in Fig. 1 a frame comprising a base 1, joining columns 2 secured to the sides and at the upper portion of the cylinder at diametric points thereof, and a stationary crosshead 2a, these elements preferably being cast integrally. The laterally disposed columns 2 and their supporting relation to the sides of the cylinder at diametric points of the upper portion is particularly advantageous. The crosshead 2a as shown in Figs. 1 and 3 is relatively deep and wide. The base 1 is preferably of circular form in plan view as shown in Fig. 2 and is hollow to form a load producing cylinder 3 which is preferably recessed as at 4 between its upper and lower ends. The bottom of the cylinder is provided with an annular rib 5 preferably disposed a substantial radial distance from the axis of the cylinder.

Figure 5:
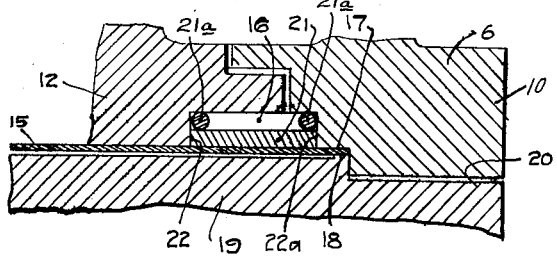
Fig. 5 is an enlarged fragmentary sectional view of one portion of the diaphragm and bridge ring structure of the hydraulic weighing support.

Disposed within the cylinder is our improved self-contained unit, Fig. 4, comprising a body member 6 preferably annular and having an upper guiding flange 7 for slidable engagement with the upper wall 8 of cylinder 3. The lower end of body 6 has an annular flange projecting inwardly as at 9 and outwardly as at 10. The inner flange 9 has an offset shoulder 11 to provide a limit stop for a diaphragm piston 12, this piston having a lip 13 lying under flange 11. A small amount of radial and axial clearance is provided between the adjacent surfaces of piston 12 and flange 9. The hydraulic weighing system, of which piston 12 forms a part, is preferably of the same specific form as that shown in Emery Patent No. 1,848,468. The diaphragm structure thereof will be described sufficiently to understand a function that it performs in our present invention in addition to its weighing function. As shown in Fig. 5, a thin sheet metal disc diaphragm 15 rests against the surface of piston 12 and extends across an annular recess 16 to be firmly clamped between the bottom surface of a recess 17 and a slightly raised portion 18 of a rigid chamber wall or head 19. This wall is preferably recessed at 20 to form said raised portion which not only clamps the peripheral edge portion of the diaphragm but also functions to maintain the wall 19 in its central position within the lower flanged end of body 6. An annular bridge ring 21 is disposed within a recess formed partly in piston 12 as at 22 and partly in body 6 as at 22a. The inner circular edge of the bridge ring radially engages piston 12, and the outer edge of the ring radially engages body 6. The bridge ring 21 in turn is axially supported in any suitable manner on the body 6 and piston 12, this support preferably being through the medium of a pair of supports of such character as to provide substantially constant position fulcrums during flexure of the ring. These fulcrum supports are specifically shown in the form of hardened wires or the like at 21a. As a result of this bridge ring construction, the diaphragm 15 is positively supported in crossing the recesses 22 and 22a and also insures a substantially constant effective diaphragm area during flexure of the diaphragm under load, and moreover the bridge ring functions as a stay plate to maintain the piston 12 in its central position with respect to body 6 and head 19 during weighing movement of piston 12 relatively thereto. This function is particularly important in the self-contained hydraulic support whereby cross-loads in the support, caused by non-central loading of a specimen, are effectively resisted and their axial component accurately weighed.

Figure 7:
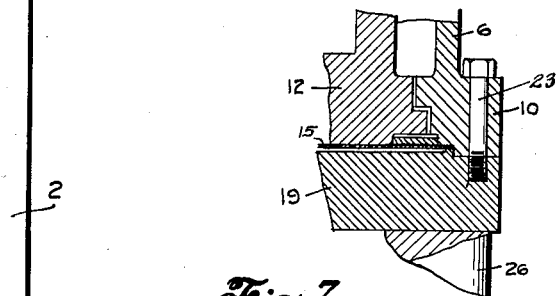
Fig. 7 is a fragmentary vertical section showing the manner of bolting the diaphragm head to its body.

The head 19 and body 6 are held together by cap screws 23 or any other suitable means as shown more clearly in Fig. 7. The hydraulic load producing system, Fig. 4, comprises a ram 26 formed substantially as a continuation of head 19 and preferably as a separable part thereof. This ram may be formed with a centering tip 27 receivable in a corresponding center recess in head 19 and held in place by a series of bolts generally indicated at 28. The ram is suitably fitted within cylinder 3 so as to be moved upwardly under fluid pressure supplied hereto from any suitable source such as a motor driven pump 30, Fig. 2. This pump may be any one of various well-known types, and various devices may be employed to suitably control the amount and pressure of fluid supplied to the cylinder. Inasmuch as the control mechanism does not form a part of the present invention, it has not been shown herein, although it will be noted that a control hand wheel 31 is suitably mounted in front of the machine and is connected to the pump control through a shaft 32.

Figure 6:
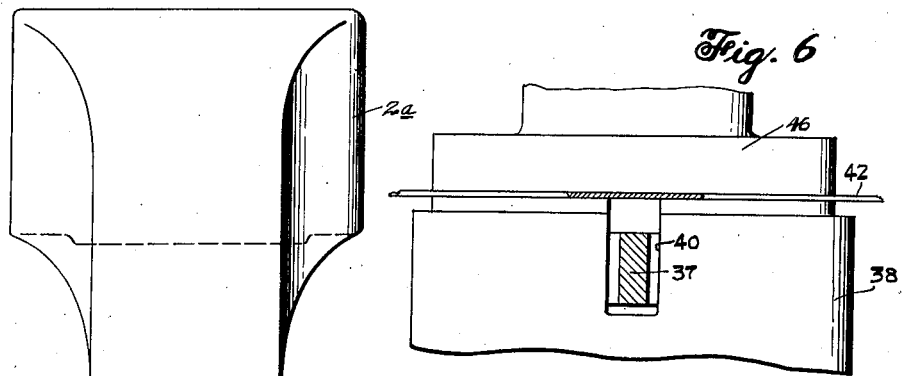
Fig. 6 is a fragmentary vertical section taken on the line 6—6 of Fig. 4.

To produce an initial load on the weighing system, we have provided an initial loading means preferably in the form of a single central compression coil spring 35 interposed between the diaphragm piston 12 and a recessed abutment 36. The abutment is supported preferably by radial ribs 37 which are secured to body 6 preferably by being cast integrally therewith. A loading column 38 preferably of annular form extend axially from diaphragm piston 12 and terminates in an upper free end 39. To permit this loading column to extend past ribs 37, a pair of vertically extending recesses 40 are formed in column 38 as shown in Figs. 4 and 6. To laterally support the upper end of the column, an annular stay plate 42 is interposed between the column and body 6. The outer circular edge of the stay plate is disposed in a suitable recess of body 6 and clamped therein by an annular ring 43 held in place by screws or bolts 44. The inner circular edge of stay plate ring 42 is disposed in a suitable recess at the upper end of column 38 and is clamped therein by a suitable flange 45 of a load platform or base 46, this base being secured to column 38 by screws or bolts generally indicated at 47. The base 46 is preferably cylindrical in plan view and is elongated axially so as to provide ample clearance above the upper end of the combined base and cylinder 1. A suitable cover 48 preferably of heavy sheet metal but which might be of cast material is provided with a pair of inner and outer annular flanges 49 and 50, the inner flange forming a supporting or spacing member engaging an enlarged radial portion of base 46 and held against the same by screws 50'. The outer annular flange 50 overhangs cylinder 1 at its upper end which is preferably of reduced thickness.

From the foregoing it is seen that the hydraulic load producing ram 26, the hydraulic weighing system 12, 19, 15, etc., the initial load spring 35, the load platform 46 and the upper and lower stay plate means such as 42, and the bridge ring 21 all constitute a self-contained unit that bodily moves upwardly when load is produced on a specimen. In addition, the piston 12, loading column 38 and platform 46 have their weighing movement superimposed upon said body movement of the self-contained unit.

To measure the load applied to the specimen, there is preferably provided suitable Bourdon tube type gauges generally indicated at 53 and 54, these gauges being calibrated for different load ranges. The details of construction of such a gauge need not be described, as it is well known that the indicating hands 55 are rotated through a Bourdon tube supplied with fluid under pressure from the diaphragm chamber of the weighing system. However, to permit pressure to be transmitted from such chamber to the indicating mechanism, without introduction of error due to the bodily movement of the chamber, we have provided a connecting pipe 56 having a series of coils 57 wrapped around the body 6, the final coil leading upwardly as at 58 through a suitable opening 59 in the upper flanged portion 7 of body 6. This pipe thence continues over the top of cylinder 1 and through the flange 50 to the indicating mechanism. The piping is preferably secured to the cylinder 1 so that the entire flexibility of the pipe during bodily movement of the self-contained unit is taken up in the coils 57. It will be understood, however, that the force necessary to flex the piping during bodily movement of the hydraulic support does not affect the weighing system. The weighing system measures only the force actually applied to the specimen.

To prevent rotation of the self-contained unit within its cylinder, we have provided a keyway 61 in the upper portion 8 of base 1 while a key 62 is secured to flange 7 by screws or other suitable means. A suitable annular dirt wiper or packing 64 preferably of felt is held on the top of flange 7 by an annular keeper ring 65.

It will be noted from Figs. 1 and 2 that the indicating mechanisms 53 and 54 are mounted in wings 67 supported on the joining column 2 and extending forwardly as shown in Fig. 2. This provides not only an extremely sturdy and convenient arrangement for supporting the indicating mechanism without the need of separate supporting stands but also provides a convenient arrangement for reading the indicating mechanism from a central position in front of the machine, thus permitting the operator to perform a test and read the load while standing or sitting directly in front of the machine. It will be understood that the combined cylinder and base 1 is of relatively low height, thus permitting a man to sit on a stool while conducting the tests. Such a convenient arrangement is of value where a great number of successive tests are being run.

A specimen in compression is disposed between base 46 and an upper support in the form of a disc 69. This disc is seated through a spherical connection 70 on a pedestal 71 which projects downwardly from the upper crosshead 2a. The pedestal is removably held in a suitable socket in the crosshead and is of such length that upon removal a clear space is left between the top of base 1 and the crosshead 2a whereby the self-contained unit may be lifted bodily upwardly clear of the base and then moved laterally to be free of the machine to permit inspection or repair.

*Operation.*—From the foregoing disclosure it is believed that the mode of operation of the preferred form of the invention is clear but briefly described it consists of supplying fluid pressure to the lower end of cylinder 3 from fluid pump 30. The fluid pressure moves the load producing ram 26 upwardly together with the hydraulic weighing system which includes the diaphragm 15 and diaphragm piston 12 and its column 38. The body 6, initial load spring 35, platform 46, and the associated mechanism also move upwardly with the ram, thereby to apply load to a specimen interposed between table 46 and upper pedestal 71. Inasmuch as the diaphragm chamber is interposed between the ram 26 and column 38, it is seen that the hydraulic pressure of the liquid in the weighing system is in direct proportion to the load actually applied to the specimen. Friction forces between the ram and its cylinder will not be transmitted to the weighing system, and hence only the axial force actually applied to the specimen will be reflected in the weighing pressure. This pressure is measured by the gauges 53 or 54 and the load indicated by hands 55. The initial load spring 35 causes the liquid of the hydraulic support (diaphragm arrangement) to be placed under an initial load independently of the loading ram and cylinder, thereby to cause the apparatus to have a much more dependable and constant zero setting, and this insures highly accurate results throughout the full load range of the machine.

Any eccentric loading of the specimen or cross load as during rupture will not affect operation of the self-contained unit or the weighing system thereof as such eccentricity or cross loads will be resisted by the upper annular stay plate 42 and the lower stay plate action of bridge ring 21. When the test has been completed, the fluid pressure from pump 30 is released, or the pump itself is suitably controlled, by hand wheel 31 so as to discharge fluid pressure from cylinder 3, thereby allowing the self-contained unit to move downwardly by gravity.

Figure 8:
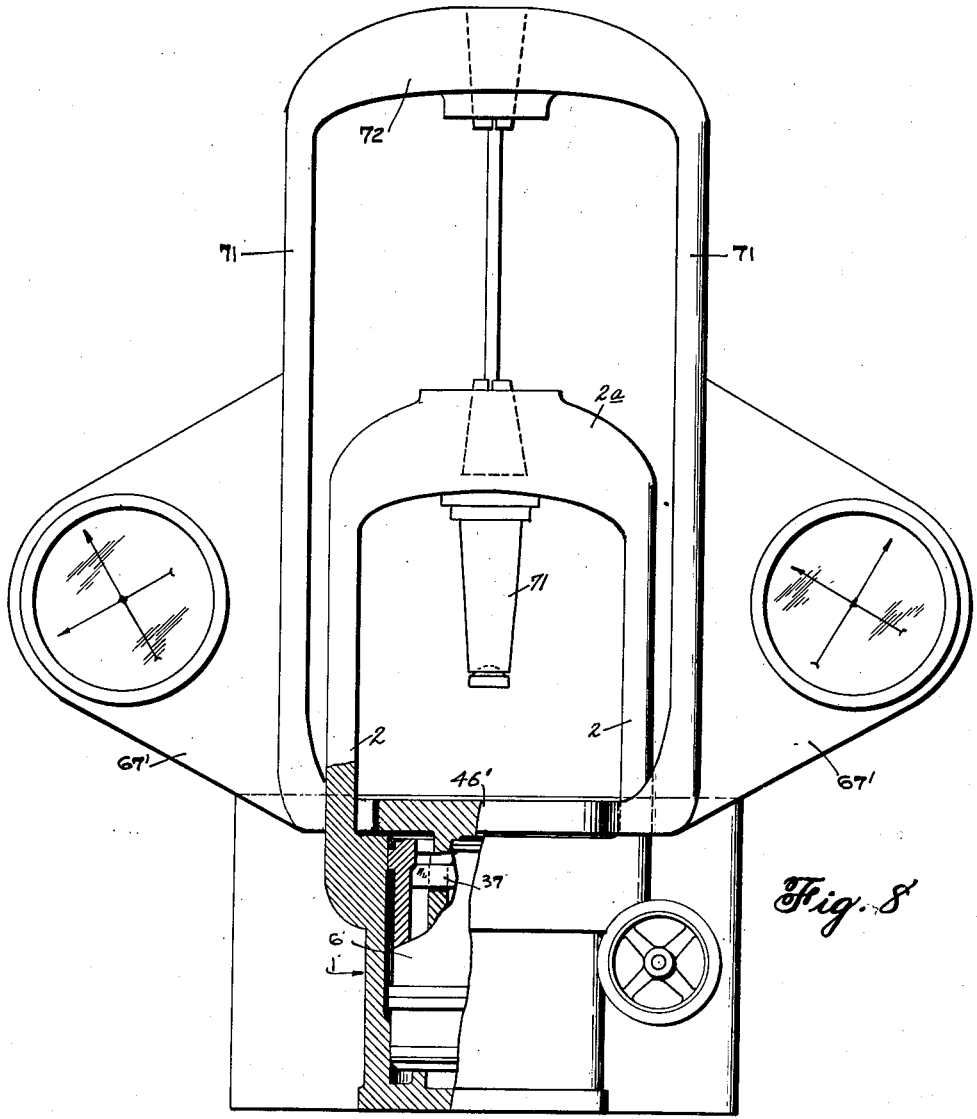
Fig. 8 is a modification showing how our improved self-contained unit may be employed in a universal machine for either tension or compression tests and to illustrate the manner in which the indicating mechanism may be operatively supported by the self-contained unit so as to move therewith.

In the modification shown in Fig. 8, the same general arrangement is employed as shown in Fig. 1 except that the upper end of loading column 30 is provided with an enlarged base 46' to take the place of base 46 of Fig. 4. Tension side rods 71 are also provided, these extending upwardly to an upper movable crosshead 72 overlying the stationary crosshead 2a. It will be understood that the tension rods 71 are displaced to the side of joining columns 2 and that to perform a tension test, the movable crosshead 72 and the crosshead 2a are provided with any usual form of grips for holding the specimen. In this arrangement the indicating mechanisms 53 and 54 are supported by one or both of the tension columns 71 through brackets 67'. With this universal machine, it is possible for the loading and load weighing systems to have considerable axial movement without the need of any flexible pressure pipe such as coils 57. The operation of this machine is otherwise the same as in the preferred form.

From the foregoing disclosures it is seen that we have provided an extremely compact and sturdy machine which is economical in manufacture, maintenance and operation and which does not involve any sacrifice in the accuracy or sensitivity of the well-known qualities of a hydraulic load producing machine of the type employing an independent hydraulic weighing system. Notwithstanding the inherent accuracy and sensitivity of a hydraulic weighing support of the type shown herein, it is possible to take the self-contained unit alone and calibrate the weighing system thereof independently of the machine in which the support is ultimately used thus permitting such calibrating operation to be performed in a laboratory if so desired with the assurance that the accurate calibration will not change when the self-contained unit is shipped out and installed.

A removable filling connection 80 extending through a suitable opening in the frame permits oil to be added to the diaphragm chamber while a gauge hole 81 permits a feeler gauge to determine the position of piston 12 relative to base 19. Such a gauge is inserted between lip 13 and flange 11 (at a point adjacent opening 81).

It will of course be understood that various changes in details of construction and arrangement of parts may be made by those skilled in the art without departing from the spirit of the invention as set forth in the appended claims.

We claim:

1. A materials testing machine comprising, in combination, means for engaging one end of a specimen, hydraulic cylinder and ram elements one of which is movable for applying load to the other end of the specimen, a weighing system bodily movable with said movable element for measuring the load applied to the specimen, and means also bodily movable both with said movable element and weighing system for imposing an initial load thereon.

2. A materials testing machine comprising, in combination, means for engaging one end of a specimen, hydraulic cylinder and ram elements one of which is movable for applying load to the other end of the specimen, a hydraulic weighing support bodily movable with said movable element for measuring the load applied to the specimen, and stay plate means operatively connected to and movable with said movable element for laterally supporting said weighing support.

3. The combination set forth in claim 2 further characterized by the provision of means for preventing rotation of said ram, stay plate means and weighing means.

4. The combination set forth in claim 2 further characterized by the provision of load indicating means and a pipe, movable with the movable one of said ram and cylinder elements, for transmitting pressure from said hydraulic support to said indicating means.

5. The combination set forth in claim 2 further characterized by the provision of an indicating mechanism mounted in a fixed position, and a fluid pipe between the hydraulic support and indicating mechanism including a flexible coiled portion in said pipe.

6. The combination set forth in claim 2 further characterized by the provision of a load indicating mechanism movable with the movable element and operatively connected with the weighing system to measure the load thereof.

7. A materials testing machine comprising, in combination, means for engaging one end of a specimen, a hydraulic cylinder, and a self-contained unit having load producing and load weighing elements each disposed within said cylinder for applying load to the specimen through its other end and measuring the applied load, and stay means and initial load means both for said load weighing elements.

8. A materials testing machine comprising, in combination; means for engaging one end of a specimen; a hydraulic cylinder; and a self-contained unit therein for applying load to the specimen through its other end including a ram, a weighing system and initial load means for said weighing system.

9. A materials testing machine comprising, in combination; means for engaging one end of a specimen; a hydraulic cylinder; and a self-contained loading and weighing unit therein for applying load to the specimen through its other end including a ram, an abutment which is held in fixed operative relation to said ram, a diaphragm and piston disposed on the side of said ram toward said abutment, and initial load spring means interposed between said piston and abutment.

10. The combination set forth in claim 9 further characterized in that said initial load means comprises a single coiled compression spring located axially of said ram.

11. A materials testing machine comprising, in combination; means for engaging one end of a specimen; a hydraulic cylinder; and a self-contained hydraulically actuated loading and weighing unit in said cylinder having a ram, an annular body portion, a diaphragm and a piston therefor, a load column extending axially from said piston within said annular body portion, and a load platform supported on the end of said load column for engaging the other end of the specimen.

12. The combination set forth in claim 11 further characterized in that an abutment is supported by said annular body transversely thereof, and an initial load spring is interposed between said abutment and piston.

13. The combination set forth in claim 11 further characterized in that said load column has a plurality of slots extending downwardly from the end thereof, an abutment member supported by said annular body and extending through said slots transversely of said column, and a load spring interposed between said abutment and said piston.

14. The combination set forth in claim 11 further characterized in that said load column has a plurality of slots extending downwardly from the end thereof, an abutment member supported by said annular body and extending through said slots transversely of said column, and a load spring interposed between said abutment and said piston, said load platform being secured to the end of said load column and overlying said abutment.

15. The combination set forth in claim 11 further characterized by the provision of stay plate means formed as a part of the self-contained unit for laterally supporting said column.

16. The combination set forth in claim 11 further characterized by the provision of axially spaced means formed as a part of the self-contained unit for laterally supporting said column.

17. The combination set forth in claim 11 further characterized by the provision of an annular bridge ring between said piston and body whereby said bridge ring functions to laterally support said piston under eccentric loading.

18. A materials testing machine comprising, in combination, a cylinder forming the base of the machine, joining columns extending axially from said cylinder, a crosshead supported at the ends of said joining columns, and a hydraulically actuated self-contained unit having loading and weighing elements each disposed within said cylinder and including stay means and initial load means both for said weighing elements, said joining columns being of such length as to provide a clear space between the crosshead and cylinder sufficient to permit said self-contained unit to be axially lifted into said space clear of the cylinder.

19. A materials testing machine comprising, in combination, a cylinder forming the base of the machine, joining columns extending axially from said cylinder, a crosshead supported at the ends of said joining columns, a hydraulically actuated self-contained loading and weighing unit disposed in said cylinder, a frame carried by and movable with said unit, indicating mechanism, and a supporting bracket therefor secured to said frame and extending laterally therefrom, whereby said self-contained unit and said indicating mechanism are movable together as a unit.

ALBERT H. EMERY.
HERMAN J. RUCH.